United States Patent

Yamagata et al.

(10) Patent No.: US 6,611,497 B1
(45) Date of Patent: Aug. 26, 2003

(54) TS DATA FILTERING CIRCUIT IN DIGITAL BROADCASTING RECEIVER

(75) Inventors: Toyomi Yamagata, Matsubara (JP); Yoshikazu Mihara, Kawanishi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/479,232

(22) Filed: Jan. 7, 2000

(30) Foreign Application Priority Data

Jan. 11, 1999 (JP) .......................................... 11-003948

(51) Int. Cl.$^7$ .............................................. G01R 31/08
(52) U.S. Cl. ................... 370/241; 370/477; 375/240.29
(58) Field of Search ................................ 370/241, 252, 370/351, 464, 465, 477; 375/240, 240.01, 240.02, 240.25, 240.27, 240.29

(56) References Cited

U.S. PATENT DOCUMENTS

| | | | | |
|---|---|---|---|---|
| 5,898,695 A | * | 4/1999 | Fujii et al. .................. | 370/464 |
| 5,909,439 A | * | 6/1999 | Kuwabara et al. .......... | 370/389 |
| 5,966,385 A | * | 10/1999 | Fujii et al. .................. | 370/465 |
| 6,263,396 B1 | * | 7/2001 | Cottle et al. ................. | 710/263 |
| 6,369,855 B1 | * | 4/2002 | Chauvel et al. ........... | 348/423.1 |
| 6,429,902 B1 | * | 8/2002 | Har-Chen et al. ........... | 348/518 |
| 6,470,135 B1 | * | 10/2002 | Kim et al. ..................... | 386/68 |
| 6,477,185 B1 | * | 11/2002 | Komi et al. ................. | 370/536 |

* cited by examiner

*Primary Examiner*—David Vincent
(74) *Attorney, Agent, or Firm*—Arent Fox Kintner Plotkin & Kahn, PLLC

(57) ABSTRACT

A TS data filtering circuit in a digital broadcasting receiver comprises storage means for storing, when it cannot be judged whether or not a data row in a TS packet is a data row to be acquired by making matching judgment by hardware, data in the TS packet in a memory, matching judgment means for making matching judgment by software on the data stored in the memory by the storage means, and means for starting the matching judgment in the matching judgment means at a stage where data corresponding to the number of effective bytes previously determined are stored in the memory in the process of storing the data in the memory by the storage means.

2 Claims, 2 Drawing Sheets

TS DATA FILTERING CIRCUIT IN DIGITAL BROADCASTING RECEIVER

BACKGROUND OF THE INVENTION

1. Field of the Invention

The present invention relates to a TS data filtering circuit in a digital broadcasting receiver for receiving digital broadcasting such as BS digital broadcasting.

2. Description of the Prior Art

In a BS digital broadcasting receiver, matching judgment in a case where data in a necessary TS packet are separated from an MPEG transport stream (TS) is made only by hardware, as shown in FIG. 2. Therefore, a range in which the matching judgment is made is limited to a previously determined range W of several bytes previously determined from the head of each of TS packets.

In the future, it is considered that identification data is inserted into a position beyond the range W from the head of the TS packet. In such a case, it is considered that matching judgment on data, beyond the range W, in a data row in the TS packet is made by software.

Consider a case where the range in which the matching judgment by hardware is made is a range of 16 bytes from the head of the TS packet, for example. In this case, when identification data relating to matching judgment is inserted into a position corresponding to the 32-th byte from the head of a TS packet ① shown in FIG. 2, the following operations are performed.

Specifically, the matching judgment by hardware is made in a range of 16 bytes from the head of the TS packet ①. At this stage, when it cannot be judged whether or not the data row is a data row to be acquired, the whole of the data row in the TS packet ① is stored once in a memory by a TS data separation portion, and the matching judgment by software is then made on data, corresponding to the 17-th byte and the subsequent bytes from the head of the TS packet ①, in the data row stored in the memory.

When it is not judged that the data row in the TS packet ① is a data row to be acquired at the position corresponding to the 32-th byte from the head of the TS packet ①, the TS data separation portion is restarted.

In such a method, when a data row in a TS packet ② shown in FIG. 2 is a data row to be acquired, for example, the matching judgment by software is made after the whole of the data row in the TS packet ① is stored in the memory. Accordingly, it takes long until the TS data separation portion is restarted, so that the data row in the TS packet ② cannot be judged.

SUMMARY OF THE INVENTION

An object of the present invention is to provide a TS data filtering circuit in a digital broadcasting receiver, wherein in a case where identification data required to judge whether or not data is to be acquired is inserted into a position beyond a range in which matching judgment by hardware is made from the head of a TS packet, time required for the matching judgment on the TS packet can be shortened, thereby avoiding the possibility that a data row to be acquired cannot be judged.

A TS data filtering circuit according to the present invention is characterized by comprising a matching judgment portion for making matching judgment on data included in a predetermined range from the head of a TS packet by hardware; storage means for storing, when it cannot be judged whether or not a data row in the TS packet is a data row to be acquired by the matching judgment in the matching judgement portion, data in the TS packet in a memory; matching judgment means for making matching judgment by software on the data stored in the memory by the storage means; and means for starting the matching judgment in the matching judgment means at a stage where data corresponding to the number of effective bytes previously determined are stored in the memory in the process of storing the data in the memory by the storage means.

When the matching judgment means does not judge that the data row is a data row to be acquired, matching judgment on the subsequent TS packet is started by the matching judgment portion.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
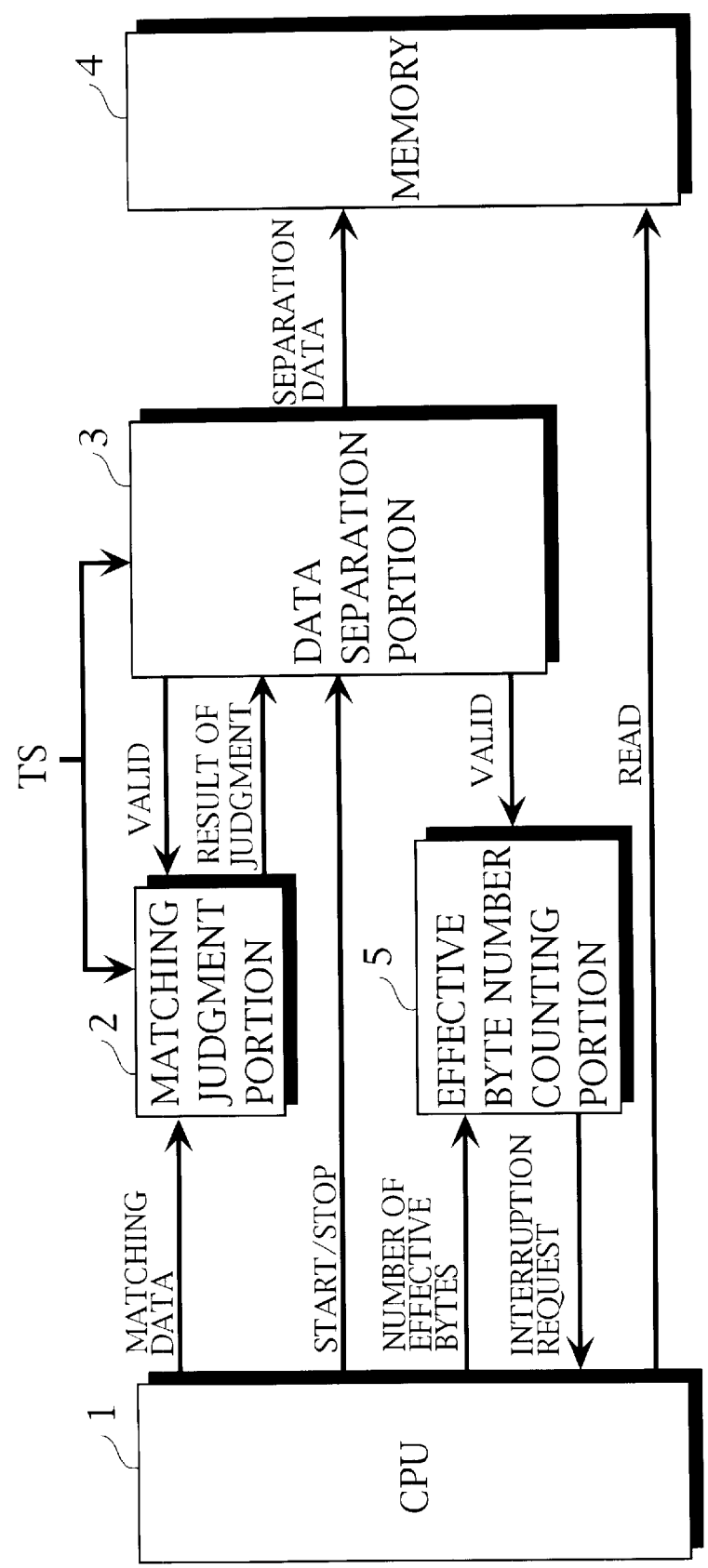
FIG. 1 is a block diagram showing the configuration of a TS data filtering circuit in a digital broadcasting receiver.

Referring now to the drawings, description is made of an embodiment in a case where the present invention is applied to a BS digital broadcasting receiver.

FIG. 1 illustrates the configuration of a TS data filtering circuit in a digital broadcasting receiver.

The TS data filtering circuit comprises a CPU 1 for making matching judgment by software, for example, a matching judgment portion 2 for making matching judgment by hardware, a TS data separation portion 3 for separating data from a transport stream (TS), a memory 4 storing the data separated by the TS data separation portion 3, and an effective byte number counting portion 5 for outputting an interruption request for staring matching judgment by software.

The matching judgment portion 2 for making matching judgment by hardware makes the matching judgment on data in a range of 16 bytes from the head of a TS packet. The number of effective bytes previously determined by the CPU 1 is set in the effective byte number counting portion 5. 32 bytes shall be set as the number of effective bytes.

Figure 2:
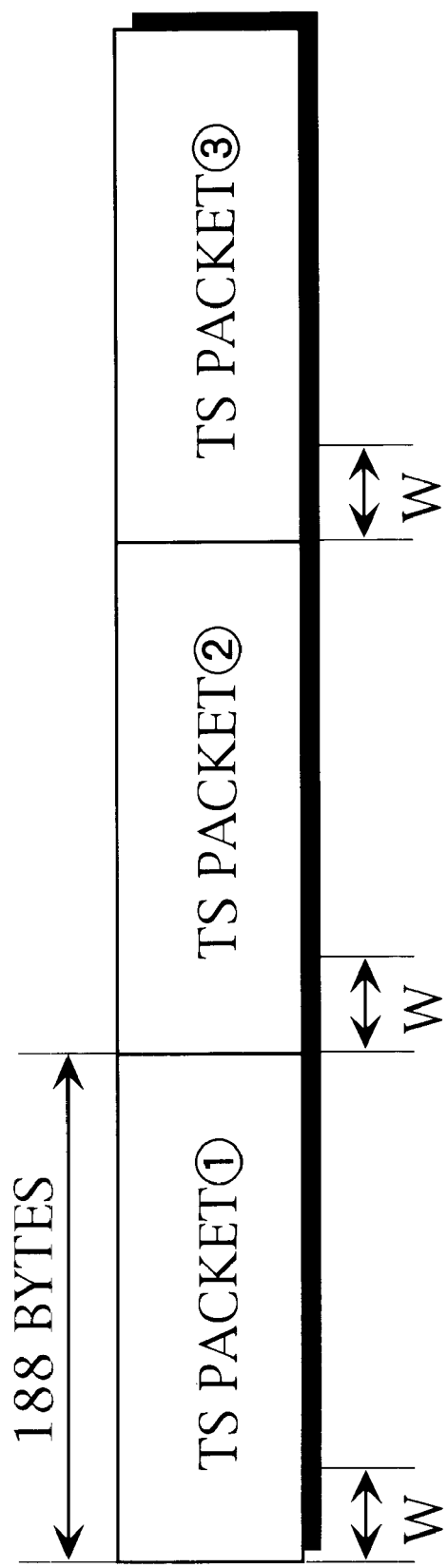
FIG. 2 is a schematic view showing an MPEG transport stream.

In FIG. 2, identification data relating to matching judgment shall be inserted into a position corresponding to the 32-th byte from the head of a TS packet ①. A data row in a TS packet ② shown in FIG. 2 shall be a data row to be acquired.

The matching judgment is made on data in a range of 16 bytes from the head of the TS packet ① by the matching judgment portion 2. At this stage, when it cannot be judged whether or not the data row is a data row to be acquired, a data row in the TS packet ① is stored in the memory 4, starting at its head.

When the data row is stored in the memory 4 because the matching judgment portion 2 cannot thus judge whether or not the data row is a data row to be acquired, the effective byte number counting portion 5 counts the number of bytes composing the data stored in the memory 4 on the basis of a signal from the TS data separation portion 3, and outputs the interruption request to the CPU 1 when the counted number reaches the number of effective bytes previously set.

The CPU 1 starts the matching judgment by software on data corresponding to the 17-th byte and the subsequent bytes from the head of the data row in the TS packet ① stored in the memory 4 when an interruption signal is inputted. When it is not judged that the data row is a data row to be acquired, the TS data separation portion 3 is restarted.

From the time point where the data corresponding to the number of effective bytes previously determined are stored in the memory without waiting until the data at the final end of the data row in the TS packet ① is stored, the matching judgment by software is started. Accordingly, it is judged whether or not the data row is a data row to be acquired at the earlier time point, as compared with that in the conventional example. When it is not judged that the data row is a data row to be acquired, therefore, the TS data separation portion 3 can be restarted before the subsequent TS packet ② is inputted, thereby avoiding the possibility that the data row to be acquired cannot be judged.

According to the present invention, when identification data required to judge whether or not a data row is to be acquired is inserted in a position beyond a range in which matching judgment by hardware is made from the head of a TS packet, time required for the matching judgement on the TS packet is shortened, thereby avoiding the possibility that the data row to be acquired cannot be judged.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A TS data filtering circuit in a digital broadcasting receiver, comprising:

a matching judgment portion for making matching judgment on data included in a predetermined range from the head of a TS packet by hardware;

storage means for storing, when it cannot be judged whether or not a data row in the TS packet is a data row to be acquired by the matching judgment in the matching judgement portion, data in the TS packet in a memory;

matching judgment means for making matching judgment by software on the data stored in the memory by the storage means; and means for starting the matching judgment in the matching judgment means at a stage where data corresponding to the number of effective bytes previously determined are stored in the memory in the process of storing the data in the memory by the storage means.

2. The TS data filtering circuit in the digital broadcasting receiver according to claim 1, further comprising means for starting, when the matching judgment means does not judge that the data row is a data row to be acquired matching judgment on the subsequent TS packet by the matching judgment means.

* * * * *